United States Patent
Huang

(10) Patent No.: US 9,810,155 B2
(45) Date of Patent: Nov. 7, 2017

(54) METHOD FOR STARTING AIRCRAFT ENGINES

(71) Applicant: GE Aviation Systems LLC, Grand Rapids, MI (US)

(72) Inventor: Hao Huang, Vandalia, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/915,066

(22) PCT Filed: Sep. 6, 2013

(86) PCT No.: PCT/US2013/058461
§ 371 (c)(1),
(2) Date: Feb. 26, 2016

(87) PCT Pub. No.: WO2015/034517
PCT Pub. Date: Mar. 12, 2015

(65) Prior Publication Data
US 2016/0208709 A1 Jul. 21, 2016

(51) Int. Cl.
| F02N 11/04 | (2006.01) |
| H02K 23/52 | (2006.01) |
| H02P 9/04 | (2006.01) |
| F02C 7/26 | (2006.01) |
| F02C 7/268 | (2006.01) |

(Continued)

(52) U.S. Cl.
CPC ............... *F02C 7/26* (2013.01); *F02C 7/268* (2013.01); *F02N 11/006* (2013.01); *F02N 11/04* (2013.01); *F02N 11/08* (2013.01); *H02M 7/68* (2013.01); *H02P 9/08* (2013.01); *F02N 11/087* (2013.01); *F02N 2011/0896* (2013.01); *H02P 2101/30* (2015.01); *Y02T 50/671* (2013.01)

(58) Field of Classification Search
USPC ............................................ 290/31, 32, 36 R
See application file for complete search history.

(56) References Cited

U.S. PATENT DOCUMENTS

| 6,992,403 B1 * | 1/2006 | Raad ....................... F02C 7/275 |
| | | 290/10 |
| 7,508,086 B2 * | 3/2009 | Huang .................... F02N 11/04 |
| | | 290/31 |

(Continued)

FOREIGN PATENT DOCUMENTS

| CN | 102597489 A | 7/2012 |
| EP | 2028758 A1 | 2/2009 |
| GB | 2422875 A | 9/2006 |

OTHER PUBLICATIONS

Unofficial English Translation of Chinese Office Action issued in connection with corresponding CN Application No. 201380079382.5 on Dec. 5, 2016.

(Continued)

*Primary Examiner* — Pedro J Cuevas
(74) *Attorney, Agent, or Firm* — GE Global Patent Operation; William S. Munnerlyn

(57) ABSTRACT

A method of starting an aircraft having at least a first starter/generator (S/G) and a second S/G using at least one inverter/converter and at least one of an AC power source and a first DC power source, the method includes selectively starting at least one of the first S/G or second S/G in an AC start mode and in a DC start mode.

10 Claims, 3 Drawing Sheets

(51) Int. Cl.
  *F02N 11/00*   (2006.01)
  *F02N 11/08*   (2006.01)
  *H02P 9/08*    (2006.01)
  *H02M 7/68*    (2006.01)
  *H02P 101/30*  (2015.01)

(56) References Cited

U.S. PATENT DOCUMENTS

| | | | |
|---|---|---|---|
| 7,687,928 | B2 | 3/2010 | Taneja et al. |
| 7,821,145 | B2 | 10/2010 | Huang et al. |
| 8,030,788 | B2 | 10/2011 | Xu et al. |
| 8,039,983 | B2 * | 10/2011 | Cote .......... H02P 9/04 290/32 |
| 8,089,170 | B2 * | 1/2012 | Patterson ........ F02C 7/275 290/40 R |
| 8,148,834 | B2 | 4/2012 | Huang et al. |
| 8,304,927 | B2 * | 11/2012 | Cote .......... H02P 9/04 290/32 |
| 2006/0042267 | A1 | 3/2006 | Thompson |
| 2006/0061213 | A1 | 3/2006 | Michalko |
| 2007/0222220 | A1 * | 9/2007 | Huang ........ F02N 11/04 290/31 |
| 2008/0093850 | A1 * | 4/2008 | Taneja ......... F01D 15/10 290/36 R |
| 2009/0174188 | A1 * | 7/2009 | Huang ........ F02N 11/04 290/46 |
| 2010/0038961 | A1 | 2/2010 | Divito |
| 2010/0133813 | A1 * | 6/2010 | Cote .......... H02P 9/04 290/32 |
| 2010/0194203 | A1 * | 8/2010 | Patterson ........ F02C 7/275 307/82 |
| 2010/0295301 | A1 * | 11/2010 | Huang ........ F02N 11/04 290/31 |
| 2012/0091716 | A1 * | 4/2012 | Cote .......... H02P 9/04 290/46 |
| 2012/0211981 | A1 | 8/2012 | De Wergifosse |
| 2012/0232728 | A1 | 9/2012 | Karimi |
| 2014/0103650 | A1 * | 4/2014 | Nguyen ........ F02N 11/087 290/31 |
| 2014/0333127 | A1 * | 11/2014 | Edwards ........ B60R 16/03 307/9.1 |
| 2016/0208709 | A1 * | 7/2016 | Huang ........ F02C 7/268 |
| 2017/0107910 | A1 * | 4/2017 | Huang ........ B60R 16/03 |

OTHER PUBLICATIONS

Unofficial English translation of Office Action and Search Report issued in connection with corresponding JP Application No. 2016540860 dated Feb. 28, 2017.

* cited by examiner

METHOD FOR STARTING AIRCRAFT ENGINES

BACKGROUND OF THE INVENTION

There currently exists starter/generator systems for aircraft, which are used to both start an aircraft engine, and to convert mechanical energy from the aircraft engine after it has started to electrical energy for power systems on the aircraft. In these systems, for instance, variable voltage, variable frequency power is connected to drive the starter/generator in a starting mode. After starting, the starter/generator operates in a generating mode, generating power for the aircraft.

BRIEF DESCRIPTION OF THE INVENTION

A method of starting an aircraft having at least a first turbine engine having a first starter/generator (S/G) and a second turbine engine having a second S/G using at least one DC/AC inverter/converter and at least one of an AC power source and a first DC power source, the method includes selectively starting at least one of the first S/G or second S/G in an AC start mode, where AC power output is supplied to the at least one of the first S/G or second S/G, bypassing the DC/AC inverter/converter, and in a DC start mode, where the DC power output is supplied to the DC/AC inverter/converter, which inverts the DC power output to a second AC power output, which is then supplied to the at least one of the first S/G or second S/G.

DESCRIPTION OF EMBODIMENTS OF THE INVENTION

While the invention is generally directed to the starting of a jet engine, such as a turbine engine, such engines are typically started with an electric machine, and more specifically with an electric motor in the form of a starter/generator (S/G). Therefore, in understanding the invention, it will be helpful to first understand the operation of such an electric machine, which is used in the starting of a turbine engine.

Figure 1:
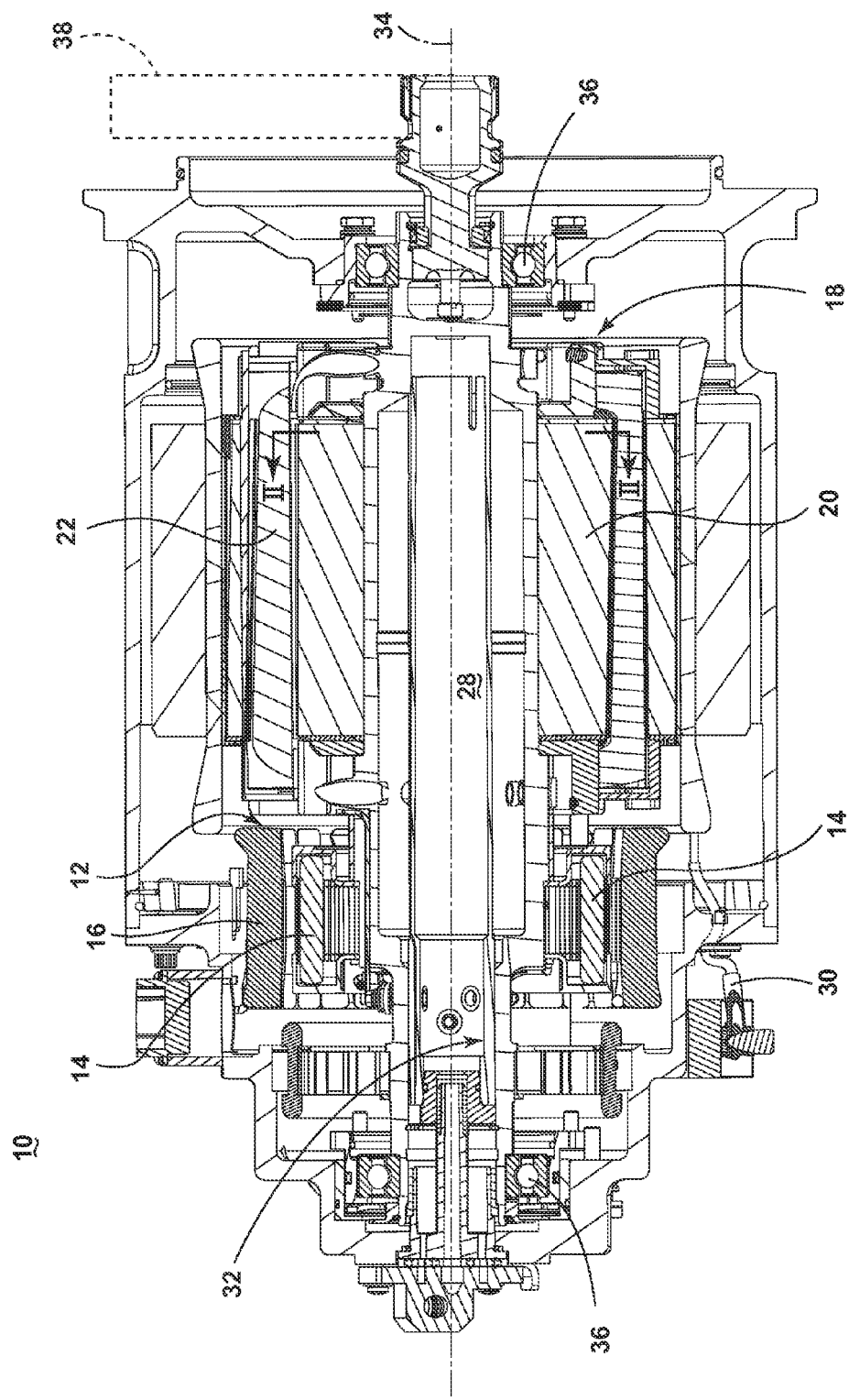
FIG. 1 is a sectional view of a starter/generator assembly.

FIG. 1 illustrates an electric machine assembly 10 mounted on or within a gas turbine aircraft engine. The gas turbine engine may be a turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region to increase the velocity of the exhausted gases, and thereby increasing thrust.

The electrical machine assembly 10 comprises a first machine 12 having an exciter rotor 14 and an exciter stator 16, and a synchronous second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 30, directly or indirectly, to the electrical load and may provide for a three phase with a ground reference output from the electrical machine assembly 10.

The electrical machine assembly 10 further comprises a rotatable shaft 32 mechanically coupled to a source of axial rotation, which may be a gas turbine engine (not shown), about a common axis 34. The rotatable shaft 32 is supported by spaced bearings 36. The exciter rotor 14 and main machine rotor 20 are mounted to the rotatable shaft 32 for rotation relative to the stators 16, 22, which are rotationally fixed within the electrical machine assembly 10. The stators 16, 22 may be mounted to any suitable part of a housing portion of the electrical machine assembly 10. The electrical machine assembly 10 may also comprise a mechanical shaft 37 (shown as a schematic box) that couples the rotatable shaft 32, for instance, with the gas turbine engine (not shown). The mechanical shaft 37 is configured such that rotation of the rotatable shaft 32 produces a mechanical force that is transferred through the shaft 37 to provide rotation to the gas turbine engine.

In the illustrated embodiment, the second machine 18 is located in the rear of the electric machine assembly 10 and the first machine 12 is positioned in the front of the electric machine assembly 10. Other positions of the first machine 12 and the second machine 18 are envisioned.

Figure 2:
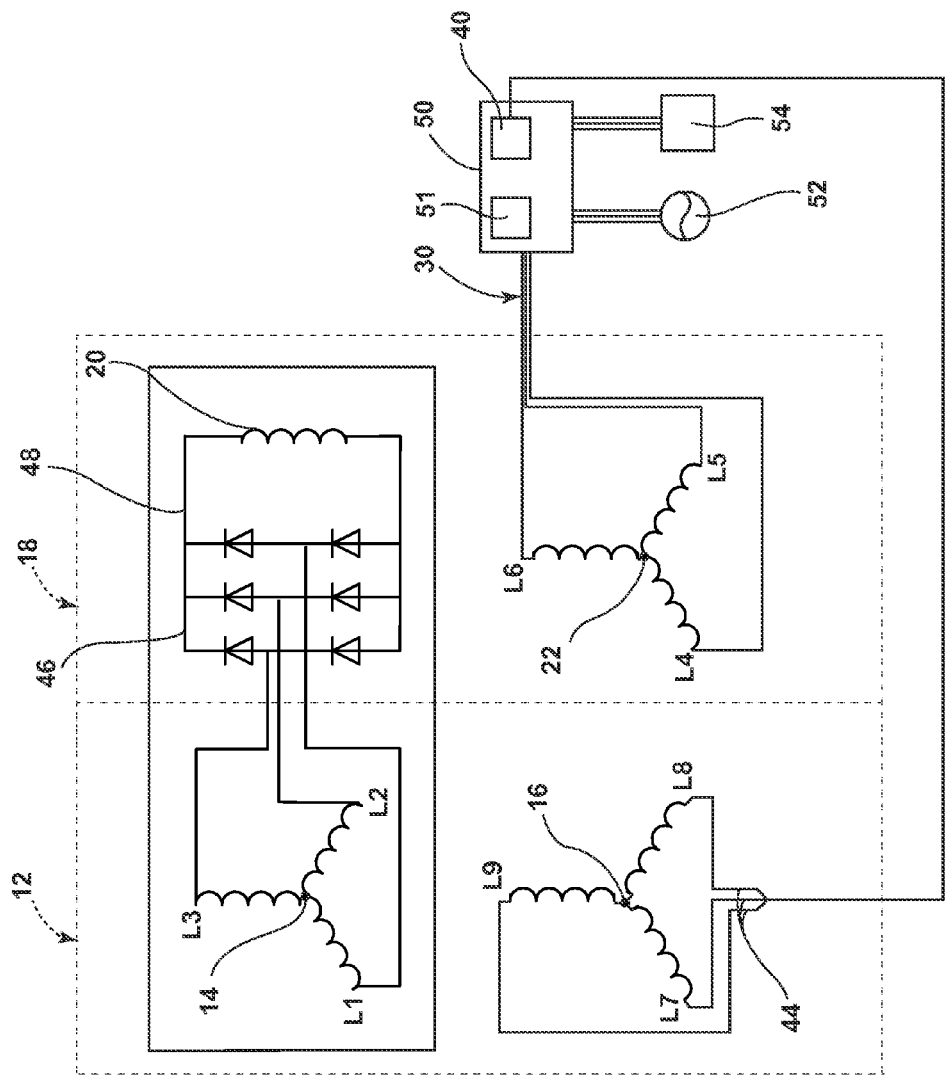
FIG. 2 is a schematic view of a starter/generator assembly rotatable shaft.

Turing now to FIG. 2, the electric machine assembly 10 further comprises an exciter power source 40 coupled with the exciter stator 16 by output leads 44. As shown, the exciter stator 16 comprises three leads L7, L8, L9 for providing three phase excitation. The exciter power source 40 provides three phase AC power output to provide excitation to each of the three exciter stator 16 leads L7, L8, L9. Although the exciter stator 16 is shown having three leads L7, L8, L9, alternative configurations are envisioned wherein the stator 16 may have only a single lead, or any number of multiple leads. Correspondingly, the exciter power source 40 may provide single or multiple phase AC power output to each of the configured leads. The exciter power source 40 may, for instance, include power from an auxiliary power unit (APU), the power output of another running turbine engine or another electric machine 10, a common three phase wall plug, a ground power cart or even a direct current (DC) source such as batteries, when coupled with an inverter to generate the necessary exciter excitation.

The exciter rotor 14 comprises windings arranged to provide for three phase output along leads L1, L2, L3 which, as illustrated, are supplied to a rectifier 46, which is illustrated as a diode-based rotating rectifier. The rectifier 46 further supplies a common supply line 48 to the main machine rotor 20.

The main machine stator 22 has leads L4, L5, L6 arranged to couple with a control circuit 50 wherein the stator 22 may be selectively coupled with an external alternating current (AC) power source 52 and/or an AC power bus 54 of the aircraft.

The electric machine assembly 10 operates in two distinct modes: a starting mode and a generating mode, wherein the starting mode operates to provide starting torque and acceleration of the rotatable shaft 32 and the generating mode operates by steady-state self-sufficiency, and generates an AC power output.

At the start of the starting mode, the rotatable shaft 32 is not rotating, and the electrical power cable 30 is coupled with the AC power source 52 via the control circuit 50. From this condition, the AC power output from the AC power source 52 is supplied to the second machine 18 of the electric machine assembly 10. The AC power output is driven into, for instance, the main machine stator 22 windings to generate a rotating magnetic field in the main machine stator 22, which in turn induces a current on the main machine rotor 20. The ensuing induced current generates sufficient torque upon the main machine rotor 20 to begin rotation of the attached rotatable shaft 32. Alternatively, the AC power source 52 may be coupled with any other set of windings or another electric machine assembly 10 component that may generate a starting torque on the rotatable shaft 32 in response to AC power output of the source 52.

Embodiments of the electric machine assembly 10 are envisioned wherein the control circuit 50 further comprises at least one controller 51 to control the assembly 10 during the starting mode, such that the AC power output used to start the rotation of the main machine rotor 20 is supplied by the AC power source 52 according to a starting method, algorithm, predetermined profile, optimized operation, frequency stepping-operation, or by a dynamic feedback profile based on physical or electrical characteristics of the electric machine assembly such as rated voltage or temperature measurements. Any of the aforementioned starting methods may be stored in the controller.

Once the rotatable shaft 32 reaches a minimal operational frequency, for instance, as defined by the method or algorithm, the electric machine assembly 10 changes from starting mode to generating mode. At the time of this mode change, the main machine rotor 20 may be rotating, but not rotating at the expected operational speed for the electric machine assembly. Additionally at the time of this mode change, the first electronic switch 42 toggles from the first position to the second position, and the electrical power cable 30 is coupled with the AC power bus 54 via the control circuit 50.

During the generating mode, the exciter power source 40, for instance, according to a method or algorithm, provides excitation to the exciter stator 16 wherein the excitation continues to lead the rotational frequency of the rotatable shaft 32. By leading the rotational frequency of the rotatable shaft 32, the controlled excitation accelerates the running electric machine assembly 10 to expected operational speed, or steady-state running mode.

Now operating in steady-state running mode, the steady-state rotation of the exciter rotor 14 relative to the exciter stator 16 generates a three phase output in the leads L1, L2, L3 of the exciter rotor. This three phase output is rectified by the rectifier 46 to a DC output, and supplied by the rectifier common supply line 48 to the main machine rotor 20. The rotation of the main machine rotor 20 relative to the main machine stator 22 generates a three phase output in the leads L4, L5, L6 of main machine stator 22, supplying power to the electrical power cable 30, and thus to the AC power bus 54.

Additionally, the rotation of the rotating shaft 32 may supply the mechanical energy, via the mechanical shaft 37, necessary to start the gas turbine engine. The aforementioned method of starting an electrical machine assembly 10 is merely a non-limiting example of starting a synchronous electric machine using an AC power source 52. Alternative methods of starting an electrical machine assembly 10 using an AC power source 52 are envisioned.

Figure 3:
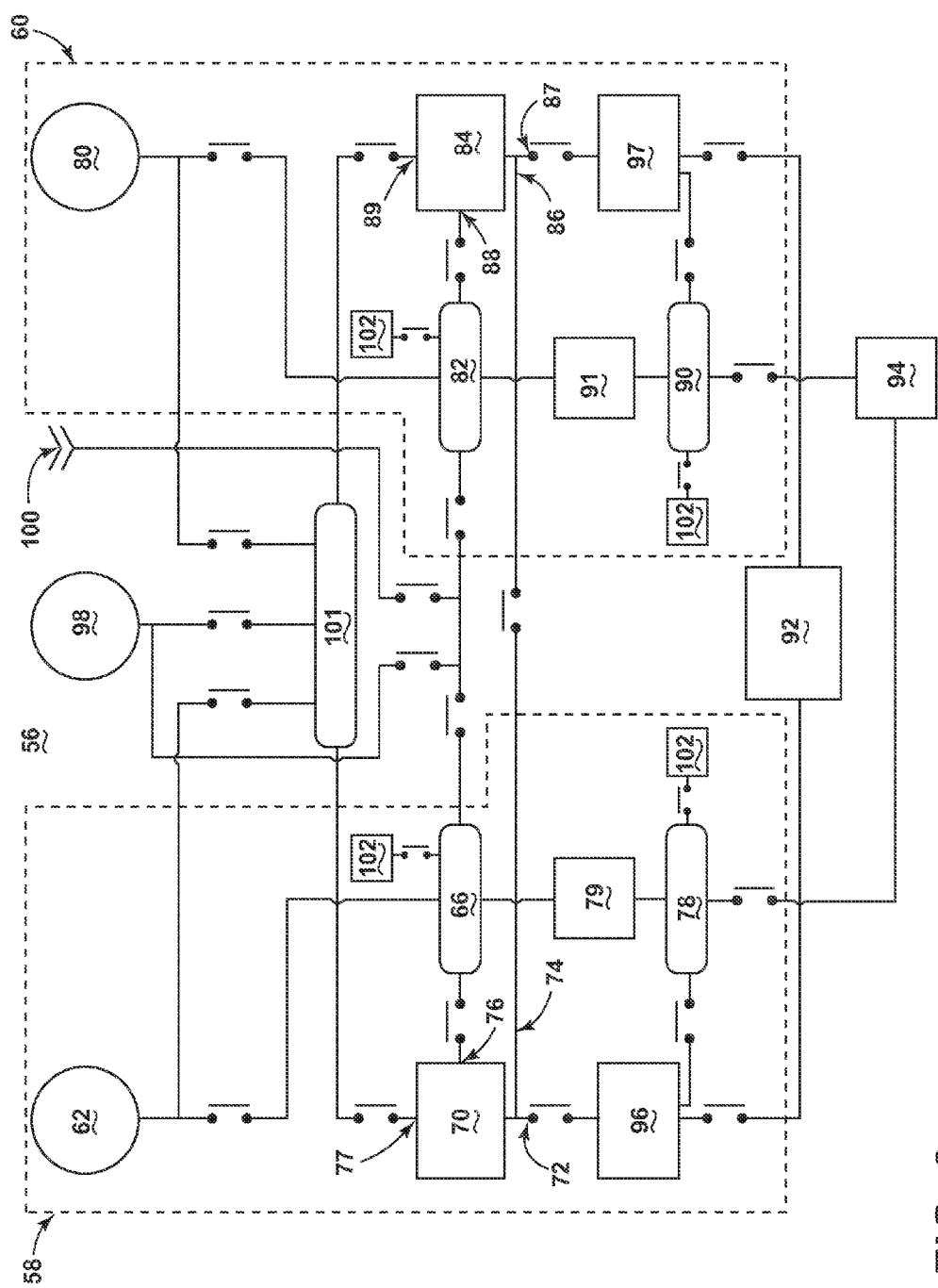
FIG. 3 is a schematic view of the electrical starting system according to an embodiment of the invention.

FIG. 3 illustrates a schematic block diagram of an electrical starting system 56 according to an embodiment of the invention. The electrical starting system 56 includes multiple engine systems, shown herein as including at least a left engine system 58 and a right engine system 60.

The left engine system 58 may include, for instance, a first starter/generator 62, such as the above described electric machine assembly 10. The left engine system 58 may further include a first AC power bus 66, a first inverter/converter 70 having a first DC lead 72, a second DC lead 74, a first AC lead 76, and a second AC lead 77, a first DC power bus 78, a first transformer rectifier unit (TRU) 79, and a first DC to DC converter 96. Similarly, the right engine system 60 may include a second starter/generator 80, a second AC power bus 82, a second inverter/converter 84 having a third DC lead 86, a fourth DC lead 87, a third AC lead 88, and a fourth AC lead 89, a second DC power bus 90, a second TRU 91, and a second DC to DC converter 97. The electrical starting system 56 is illustrated further including a main aircraft battery 92, an external DC power source 94, an auxiliary power unit (APU) 98, an external AC power source 100, and an AC start bus 101.

As shown, the first AC power bus 66 is selectively coupled with the first starter/generator 62, the first AC lead 76 of the inverter/converter 70, the APU 98, the external AC power source 100, the first TRU 79, and the second AC power bus 82. The second AC power bus 82 is further selectively coupled with the second starter/generator 80, the third AC lead 88 of the second inverter/converter 84, the APU 98, the external AC power source 100, and the second TRU 91. The first inverter/converter 70 is additionally selectively coupled with the first DC to DC converter 96 via the first DC lead 72, the second inverter/converter 84 via the second DC lead 74 of the first inverter/converter 70 and the third DC lead 86 of the second inverter/converter 84, and the start bus 101 via the second AC lead 77. The second inverter/converter 84 is further selectively coupled with the second DC to DC converter 97 via the fourth DC lead 87 and the start bus 101 via the fourth AC lead 89.

The first DC to DC converter 96 is also shown selectively coupled with the main battery 92 and the first DC power bus 78, which is further selectively coupled with the first TRU 79 and the external DC power source 94. Likewise, the second DC to DC converter is also shown selectively coupled with the main battery 92 and the second DC power bus 90, which is further selectively coupled with the second TRU 91 and the external DC power source 94. The start bus 101 is selectively coupled with each of the first starter/generator 62, second starter/generator 80, and APU 98.

While a main battery 92 is illustrated, alternative DC power sources are envisioned, such as a bank of batteries, a fuel cell, etc. Additionally, it is envisioned that the external DC power source 94 may be any DC power source, including the above mentioned types, but located externally to the aircraft. Similarly, the external AC power source 100 may be any AC power source capable of providing starting power the electrical starting system 56, for example, a ground-based APU, generator, etc.

Alternative configurations are envisioned having additional components shown and not shown. For instance, each engine system 58, 60 may further include additional electric machine assemblies 10, for instance, generators that are driven by the mechanical power of a running turbine engine. Additionally, each engine system 58, 60 may further include additional AC or DC power buses selectively coupled with each other or the respectively illustrated buses 66, 78, 82, 90. In another envisioned configuration, there may be an additional main battery, APU, and/or external AC power source for each respective engine 58, 60. It is also envisioned that the DC power buses 78, 90 may be selectively coupled with each other, or powered by a DC power output from a generator.

The electrical starting system 56 may also include AC and DC electrical loads 102, such as actuators or motors, which may be selectively coupled to each respective and appropriate AC power buses 66, 82 or DC power buses 78, 90. Additionally, the electrical starting system 56 may include an emergency electrical system not shown, configured to provide emergency power operation in the event of electrical failure. The schematic diagram of the electrical starting system 56 is merely one illustration of the starting system 56. Many other possible configurations are envisioned for embodiments of the invention.

Each first and second inverter/converters 70, 84 are configured to both, invert DC power output received at the first, second, third, and/or fourth DC leads 72, 74, 86, 87 to AC power output supplied to the respective first, second, third and/or fourth AC leads 76, 77, 88, 89. Each first and second inverter/converter may further rectify the AC power output received at the AC leads 76, 77, 88, 89 to one or more respective DC leads 72, 74, 86, 87. The inverter/converters 70, 84 are configured to invert and rectify the respective power such that they produce the supplied power at the outputs at variable or predetermined electrical characteristics, for instance 400 Hz, 120 VAC, 28 VDC, or 270 VDC, according to the design of the electrical starting system 56. Alternative rectified or inverter frequencies and voltages are envisioned. The inverter/converters 70, 88 may further be configured to supply the same DC power output to each DC lead 72, 74, 86, 87, however, dissimilar DC outputs are envisioned. Additionally, the inverter/converters 70, 88 may be configured to supply similar or dissimilar AC power outputs to each AC lead 76, 77, 88, 89.

The first and second DC to DC converters 96, 97 may act as a DC power pass-through, for instance, in transmitting the DC power output supplied from, for instance, the main battery 92, to the DC power bus 78 and/or the first lead 72 of the inverter/converter 70, or vice versa. In addition to acting as a DC power pass-through, the first and second DC to DC converters 96, 97 may convert the DC power output being transmitted in each direction to match the electrical characteristics of the destination. For instance, if the DC power bus 78 requires 270 VDC, and the main battery 92 supplies 28 VDC, the first DC to DC converter 96 may convert the 28 VDC supply to a 270 VDC output for the bus 78, or vice versa.

As shown, the external DC power source 94 supplies DC power directly to the first and second DC power buses 78, 90, thus, it is envisioned the source 94 supplies a DC power output matching the DC power characteristics of the DC buses 78, 90, for instance, 270 VDC. Each first and second DC power bus 78, 90 are additionally powered by each respective first and second AC power bus 66, 82, wherein the AC power output from each respective bus is rectified to a proper DC power bus voltage by the respective first and second TRUs 79, 91. Other configurations are envisioned, where, for example, the external DC power source 94 supplies DC power directly to the first and/or second DC to DC converters 96, 97, or supplies a DC power output to each DC power bus 78, 90 at a dissimilar DC power characteristic, and thus, will be converted by one or more additional DC to DC converters prior to supplying to the DC busses 78, 90.

Embodiments of the invention provide a robust electrical starting system 56 for starting an aircraft, wherein the electrical starting system 56 is configured to start at least one of the first starter/generator 62, second starter/generator 80, or APU 98 in an AC start mode from the AC power output of the external AC power source 100 or in a DC start mode from the DC power output from the external DC power source 94 and/or the main battery 92.

For example, in the electrical starting system 56 having a non-generating (unstarted) APU 98, and non-running left and right turbine engines 58, 60 when the system 56 begins the starting method. The starting method may initially use the external DC power source 94 to supply the starting power in a DC start mode by selectively providing the DC power output to, for instance, the first DC power bus 78, which then supplies the DC power output to the first DC to DC converter 96. Alternatively, the starting method may initially use the main battery 92 to supply the starting power by selectively providing the DC power output directly to, for instance, the first DC to DC converter 96. In either of these scenarios, the DC power output may be converted by the first DC to DC converter 96, and then supplied to the first inverter/converter 70 via the first DC lead 72. The first inverter/converter 70 may invert the DC power output to an AC power output and selectively supplied to the start bus 101 via the second AC lead 77. The start bus 101 will, for instance, selectively supply the inverted AC power output to the APU 98 to start the APU 98 into a generating mode, similar to the starting method aforementioned.

Alternatively, the start bus 101 may selectively supply the inverted AC power output to the first starter/generator 62 to start the first starter/generator 62 into a generating mode according to the starting method aforementioned. In yet another alternative operation, the start bus 101 may selectively supply the inverted AC power output to the second starter/generator 80 to start the starter/generator 80 into a generating mode.

In yet another alternative operation, the first inverter/converter 70 may selectively act as a DC power pass-through, and transmit or convert the DC power output supplied from battery 92 (via the first DC to DC converter 96) and/or the external DC power source 94 to the second inverter/converter 84, via the second DC lead 74 and the third DC lead 86. From here, the second inverter/converter 84 may invert the DC power output to an AC power output at the fourth AC lead 89, which may be selectively supplied to the start bus 101 to start the first starter/generator 62, the second starter/generator 80, or the APU 98.

In the event that the AC power output is supplied to the APU 98, the power may be selectively used to provide starting power for the APU 98, as described in the starting method above. In the event that the AC power output is supplied to the first starter/generator 62, the power may selectively provide starting power for the starter/generator 62, and thus the left engine system 58. In the event that the AC power output is supplied to the second starter/generator 80, the power may selectively provide starting power for the starter/generator 80, and thus the right engine system 60. Additionally, while the above examples demonstrate using components of the left engine system 58 to start at least one of the first starter/generator 62, the second starter/generator 80, or the APU 98 in a DC start mode, similar processes are envisioned for starting the first starter/generator 62, the second starter/generator 80, or the APU 98 using the opposing components of the right engine system 60.

In another example, the electrical starting system 56 may begin the starting method by initially using the external AC power source 100 to supply the starting power in an AC start mode by selectively providing an AC power output to the first or second AC power bus 66, 82. From here, for instance, the first AC power bus 66 may selectively supply the AC power output to the first inverter/converter 70 which then rectifies the AC power output to a DC power output. The DC power output is then selectively transmitted to the second inverter/converter 84, via the second DC lead 74 and the third DC lead 86. From here, the second inverter/converter 84 may invert the DC power output to an AC power output at the fourth AC lead 89, which may be selectively supplied to the start bus 101 to start the first starter/generator 62, the second starter/generator 80, or the APU 98. While the above example demonstrate using components of the left engine system 58 to start at least one of the first starter/generator 62, the second starter/generator 80, or the APU 98 in an AC start mode, similar processes are envisioned for starting the first starter/generator 62, the second starter/generator 80, or the APU 98 using the opposing components of the right engine system 60.

Once at least one of the APU 98, first starter/generator 62, or second starter generator 80 has been started into generating mode (hereinafter, "the generating source"), the remaining, non-started and non-generating components (hereinafter, "the non-generating components") of the electrical starting system 56, may be started. This starting method may also be accomplished in a number of ways. For example, the same external AC power source 100, external DC power source 94, or main battery 92 used to start the generating source may be used for starting the remaining non-generating components, via any of the aforementioned selectively coupled electrical paths.

In another example, the generating source may be able to provide the starting power for the non-generating components. For instance, if the first starter/generator 62 is operating in generating mode, having been initially started as explained above, the first starter/generator 62 may act as an AC power source, and provide an AC power output to the first AC power bus 66. From here, the first AC power bus 66 may selectively supply the AC power output to the first inverter/converter 70 which then rectifies the AC power output to a DC power output. The DC power output is then selectively transmitted to the second inverter/converter 84, via the second DC lead 74 and the third DC lead 86. From here, the second inverter/converter 84 may invert the DC power output to an AC power output at the fourth AC lead 89, which may be selectively supplied to the start bus 101 to start any or all of the non-generating components into a generating mode. As before, while the above example demonstrate using components of the left engine system 58 to start at least one of the first starter/generator 62, the second starter/generator 80, or the APU 98 in an AC start mode, similar processes are envisioned for starting the first starter/generator 62, the second starter/generator 80, or the APU 98 using the opposing components of the right engine system 60.

Any number of permutations may be envisioned wherein at least one of the main battery 92, external DC power source 94, and/or the external AC power source 100 initially start at least one of the first starter/generator 62, second starter/generator 80, or APU 98 into a generating mode. Once a first generating source has been initially started, any of the main battery 92, external DC power source 94, external AC power source 100, and/or first generating source may provide starting power to start a second non-generating component into a generating mode. Once the second generating source has been started, any of the main battery 92, external DC power source 94, external AC power source 100, first generating source, and/or second generating source may provide starting power to further start the last non-generating component into a generating mode.

It is important to note that different power sources may be used at different steps in the method. For instance, the main battery 92 may start the APU 98, the APU 98 may start the first starter/generator 62, and the external AC power source 100 may start the second starter/generator 80. In another example, the external AC power source 100 may start each of the APU 98, first starter/generator 62, and second starter/generator 80, in any order. It is also envisioned that any combination of power sources may provide starting power, such as combining the external AC power source 100 with the main battery 92, or combining the APU 98 with the external DC power source 94.

Many other possible embodiments and configurations in addition to that shown in the above figures are contemplated by the present disclosure. For example, one embodiment of the invention contemplates additional generating components (e.g. a third starter/generator, generator, or second APU) that may be started by extrapolating the above method to additional permutations. In another embodiment of the invention, the starter/generators 62, 80 may be configured to start respective gas turbine engines. In this example, the gas turbine engine may further provide mechanical force, for example, via a high pressure, low pressure, or intermediary spool, to operate another generator in generating mode. This aforementioned generator or generators may further be selectively coupled with any of the AC or DC power buses 66, 82, 78, 90, and may provide additional starting power for starting another starter/generator, APU, or turbine engine.

The embodiments disclosed herein provide a method of starting an aircraft having power generating components with an electrical starting system. One advantage that may be realized in the above embodiments is that the above described embodiments provide a robust starting method that allows starting from an AC or DC power sources. Another advantage of the above mentioned embodiments is that this approach may eliminate two active rectification stages and an APU DC to AC converter for APU starting. With the proposed electrical starting system, an aircraft may be started using a multitude of convenient power sources without the need for intermediary power conversion componentry on the ground or within the aircraft. By reducing the number of components, the above described embodiments have superior weight and size advantages over the conventional type APU, pneumatic, and electrical starting systems.

Yet another advantage of the above mentioned embodiments is that the selective coupling between the components, such as the AC power buses, DC power buses, and inverter/converters, provides for a highly redundant electrical starting system during normal and emergency operations. For example, the second engine system 60 needs to be started in emergency operation during flight, yet the selective coupling between the first and second AC power buses 66, 82 has failed, the electric starting system provides that power from a generating or power source may be selectively transmitted through, for example, converting the generated power from the first AC power bus 66 to the first inverter/converter 70, transmitting the converted power from the first inverter/converter 70 to the second inverter/converter 84, inverting the power, and supplying the inverted power to the second AC power bus 82 to provide starting capability for the second engine system 60.

When designing aircraft components, important factors to address are size, weight, and reliability. The above described electrical starting system has a decreased number of parts, yet provides redundant starting operation, making the complete system inherently more reliable. This results in a lower weight, smaller sized, and increased reliability system. The lower number of parts and reduced maintenance will lead to lower product costs and lower operating costs. Reduced weight and size correlate to competitive advantages during flight.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of starting an aircraft having at least a first turbine engine having a first starter/generator (S/G) and a second turbine engine having a second S/G using at least one inverter/converter and at least one of an AC power source having an AC power output and a first DC power source having a DC power output, the method comprising:
    selectively starting at least one of the first S/G or second S/G in an AC start mode, where the AC power output is supplied to a first inverter/converter, which converts the AC power output to a second DC power output supplied to a second inverter/converter, which inverts the second DC power output to a second AC power output, which is supplied to the at least one of the first S/G or second S/G, and in a DC start mode, where the DC power output is supplied to the inverter/converter, which inverts the DC power output to a second AC power output, which is then supplied to the at least one of the first S/G or second S/G.

2. The method of claim 1 further comprising selectively starting the other of the at least one first S/G or second S/G in the AC start mode, where the AC power output is supplied to a first inverter/converter, which converts the AC power output to a second DC power output supplied to a second inverter/converter, which inverts the second DC power output to a second AC power output, which is supplied to the at least one of the first S/G or second S/G, and in the DC start mode, where the DC power output is supplied to the inverter/converter, which inverts the DC power output to a second AC power output, which is then supplied to the at least one of the first S/G or second S/G.

3. The method of claim 1, further comprising selectively starting the other of the at least one first S/G or second S/G by a third AC power output from the started at least one first S/G or second S/G.

4. The method of claim 3 wherein the third AC power output is selectively supplied to a first inverter/converter, operating the inverter/converter to convert the third AC power output to a third DC power output, supplying the third DC power output to a second inverter/converter and outputting a fourth AC output, which is then supplied to the other of the at least one first S/G or second S/G.

5. The method of claim 1, further comprising selectively starting an auxiliary power unit (APU) to generate the AC power output.

6. The method of claim 5, further comprising selectively starting the other at least one first S/G or second S/G by the AC power output from the started APU.

7. The method of claim 6 wherein the AC power output is selectively supplied to a first inverter/converter, operating the inverter/converter to convert the AC power output to a third DC power output, supplying the third DC power output to a second inverter/converter and outputting a third AC output, which is then supplied to at least one of the first S/G or second S/G.

8. The method of claim 5 wherein the selectively starting the APU occurs prior to selectively starting the at least one first S/G or second S/G.

9. The method of claim 8 further comprising selectively starting at least one of the first S/G or second S/G by the AC power output from the started APU.

10. The method of claim 9 wherein the AC power output is selectively supplied to a first inverter/converter, operating the inverter/converter to convert the AC power output to a third DC power output, supplying the third DC power output to a second inverter/converter and outputting a third AC output, which is then supplied to at least one of the first S/G or second S/G.

* * * * *